R. A. SMITH.
FLEXIBLE COUPLING.
APPLICATION FILED SEPT. 5, 1914.

1,165,551.

Patented Dec. 28, 1915.

Attest:
E. M. Hamilton
C. E. Parsons

Inventor:
Robert A. Smith.
by Spear, Middleton, Donaldson & Spear
Attys.

UNITED STATES PATENT OFFICE.

ROBERT ARMSTRONG SMITH, OF MAHWAH, NEW JERSEY.

FLEXIBLE COUPLING.

1,165,551.    Specification of Letters Patent.    Patented Dec. 28, 1915.

Application filed September 5, 1914. Serial No. 860,439.

*To all whom it may concern:*

Be it known that I, ROBERT A. SMITH, a citizen of the United States, residing at Mahwah, Bergen county, New Jersey, have invented certain new and useful Improvements in Flexible Couplings, of which the following is a specification.

My present invention relates to improvements in flexible pins such as are used in flexible couplings of the type shown in Letters Patent of the United States No. 1,029,355, dated June 11, 1912. In using couplings made in accordance with said patent, I have found that under some conditions an end thrust is produced caused by the binding of the springs acting against the corner of the keepers and the object of the present invention is to provide a construction which will avoid the trouble arising from such end thrust.

The invention includes the novel features of construction and arrangement and combination of parts hereinafter described and particularly defined by the appended claims.

Several embodiments of my invention are illustrated in the accompanying drawings, in which—

Figure 1:
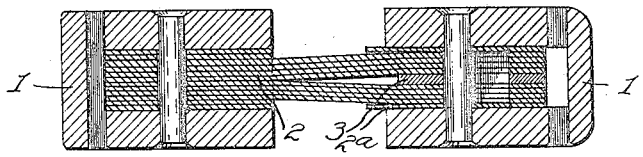
Figure 2:
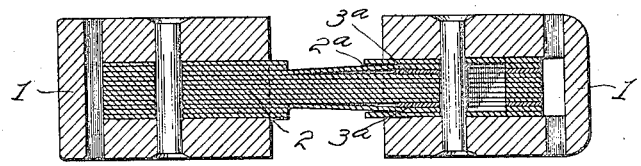
Figure 3:
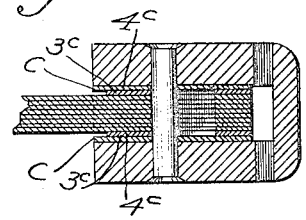

Figure 1 is a longitudinal sectional view of one form of spring pin, and Figs. 2, and 3 are similar views of modifications. Fig. 4 is a modification showing the invention used without a keeper.

Referring by reference characters to this drawing the keepers are shown at 1 and the superimposed flat steel springs constituting the flexible connecting members at 2. In order to avoid the thrust effect due to the action of the outside springs on the corners of the keepers I provide one or both of the keepers with spacing means which will space the outermost leaves from the corners. Such means may consist of a single spacing piece located centrally of the leaves as indicated at 3 which causes a rounding or inclining inward of the outer leaves away from the corners of the keepers as indicated at 2ª in Fig. 1. This rounded portion of the spring leaf avoids any end thrust which arises under side pressure of misalinement or load when the outermost springs can bind directly around the corner of the keeper.

Instead of a single centrally located spacer as shown in Fig. 1, I may use a pair of spacers 3ª interposed beneath the outermost leaves 2ª as shown in Fig. 2.

A further modification is shown in Fig. 3 in which the spacers 3ᶜ are similar to Fig. 2 but the wear strips 4ᶜ extend straight out to the ends of the keepers as indicated at c.

The construction as described to avoid the thrust effect is intended for normal operation but occasionally a coupling is overloaded, or it may be placed under such excessive misalinement that the springs are flexed beyond their normal position and in such cases they do touch the corner. Under such severe load or misalinement the touching of a spring to a corner stiffens it because it shortens the distance between supports. In other words for normal operation it is very desirable that the springs do not touch the corner as provided for by this improvement but for abnormal operation the touching of the corners is not undesirable as above explained.

The wear strips shown in Figs. 1, 2 and 3 are not essential to the success of my invention. For the purpose of this description and claims the wear strips are considered as part of the keeper, and not as spacing means or as one of the spring members. As they are held with the keepers and are considered part of the keeper, it is immaterial so far as thrust is concerned, whether the sliding spring laminated portion of the pin is immediately in contact with the main keeper part, or whether the wear strip part of the keeper intervenes.

Having thus described my invention what I claim is:

1. In a flexible pin, a keeper, a set of superimposed leaf springs having their ends seated in said keeper, and means free from contact with said keeper spacing apart certain of the leaf springs at one end.

2. In a flexible pin, a keeper, a set of superimposed leaf springs having their ends seated in said keeper the first point of contact between the outside leaf spring and the keeper being normally back of the inside edge of the keeper.

3. A flexible pin comprising a keeper having a recess, a set of superimposed leaf springs having their ends seated in said recess, and spacing means between certain of said springs.

4. A flexible pin comprising a keeper having a recess, a set of superimposed leaf springs having their ends seated in said recess, and means coöperating with said springs whereby a clearance is afforded between the edge of the keeper and said springs.

In testimony whereof I affix my signature in presence of two witnesses.

ROBERT ARMSTRONG SMITH.

Witnesses:
 ERSKINE R. EADIE,
 EDITH HEALY.